United States Patent [19]

Neuhaus

[11] Patent Number: 4,717,309
[45] Date of Patent: Jan. 5, 1988

[54] APPARATUS FOR POSITIONING A SPECIMEN

[75] Inventor: Dietmar Neuhaus, Düsseldorf, Fed. Rep. of Germany

[73] Assignee: Deutsche Forschungs—und Versuchsanstalt fur Lift—und Raumfahrt E.V., Fed. Rep. of Germany

[21] Appl. No.: 748,738

[22] Filed: Jun. 25, 1985

[30] Foreign Application Priority Data

Jun. 26, 1984 [DE] Fed. Rep. of Germany ....... 3423432

[51] Int. Cl.$^4$ .............................................. B25J 17/02
[52] U.S. Cl. ..................................... 414/735; 74/469;
74/506; 74/665 R; 269/61; 269/71; 414/744 R;
901/21; 901/26; 901/29
[58] Field of Search ........... 414/744 R, 744 A, 744 B,
414/744 C, 735; 901/15, 21, 26, 19, 25, 29;
269/58, 61, 71, 45; 474/61, 62, 87, 88; 74/665
R, 469, 506; 192/48.8

[56] References Cited

U.S. PATENT DOCUMENTS

| | | | |
|---|---|---|---|
| 2,512,636 | 6/1950 | Flynt | 269/61 |
| 3,332,392 | 7/1967 | Gessner et al. | 269/61 X |
| 3,583,363 | 6/1971 | Shrader | 269/58 X |
| 4,218,173 | 8/1980 | Coindet et al. | 901/15 X |
| 4,262,891 | 4/1981 | Kinney | 269/71 |
| 4,317,560 | 3/1982 | Troyer | 269/71 X |
| 4,531,884 | 7/1985 | Russell | 901/26 X |
| 4,568,070 | 2/1986 | Severt | 269/71 X |
| 4,662,814 | 5/1987 | Suzuki et al. | 901/26 X |

FOREIGN PATENT DOCUMENTS 8401537  4/1984  PCT Int'l Appl. .

Primary Examiner—Robert J. Spar
Assistant Examiner—P. McCoy Smith
Attorney, Agent, or Firm—Spensley Horn Jubas & Lubitz

[57] ABSTRACT

The specimen (P) can be turned about each of three axes (A, B and C) by rotation of the input shaft (10). The apparatus exhibits three brackets (H1, H2, H3) mounted on each other in the manner of a cardan joint and supported by the frame (GR). The first bracket (H1) is fixed on the frame (GR) via a clutch coupling (K1). Additional couplings (K2 and K3) connect the second bracket (H2) to the first bracket (H1) and the third bracket (H3) to the second bracket (H2). Of the three couplings, only one is ever released, while the two others are engaged. In this manner the specimen (P) can describe a movement about each of the three axes by rotation of the single input shaft (10).

7 Claims, 3 Drawing Figures

APPARATUS FOR POSITIONING A SPECIMEN

BACKGROUND OF THE INVENTION

The invention relates to an apparatus for positioning a specimen by rotation about each of three axes.

Ultra-high vacuum vessels in which a specimen inside the vessel is to be moved externally make use of rotary or translational transmission ducts to transmit the motion to the specimen. While translational transmission ducts can be led relatively easily through the wall of the vessel using a bellows, rotary transmission ducts are very difficult to engineer. For this reason it is desirable to minimize the number of rotary transmission ducts required. There are occasions where a specimen in high-vacuum has to be moved through six degrees of freedom, i.e. said specimen must be rotational about each of three axes running at right angles to one another and in addition it must be capable of being displaced along the three axes. The invention deals specifically with the problem of rotating a specimen about each of three axes that are at right angles to each other.

The problem underlying the invention is to provide an apparatus of the type stated intially that permits a specimen to rotate about each of three axes by movement of a single shaft.

SUMMARY OF THE INVENTION

In accordance with the invention the solution to this problem consists in the following:

a single input shaft mounted in a frame is provided,
a first bracket pivotably mounted co-axial to the first axis supports a second bracket which pivots on the first bracket about a second axis running at right angles to the first axis,
the second bracket supports a third bracket supporting the specimen, said third bracket pivoting on the second bracket about a third axis running at right angles to the first and second axes,
the input shaft drives the first bracket about the first axis, the second bracket about the second axis and the third bracket about the third axis, rotationally and via power transmission assemblies connected in series,
and clutch couplings are provided, of which a first coupling retains the first bracket relative to the frame, a second coupling retains the second bracket relative to the first bracket, and a third coupling retains the third bracket relative to the second bracket.

By selected actuation of the three couplings the torque of the input shaft is transmitted either to the first bracket, to the second bracket or to the third bracket. Said bracket then describes rotational movements about its axis. These rotations of the brackets can be executed individually in succession, so that the specimen can be placed in any position desired. In each case the rotary transmission is via the only input shaft present. One advantage of the apparatus according to the invention is that it takes up little space and can be manufactured in small format. The specimen is located at the point of intersection of the three axes. All the brackets are supported on the frame, and the input shaft passes through the latter. The frame can be immovably mounted on a vacuum vessel. A single rotary transmission duct only is required for the input shaft through the vacuum vessel walling.

In one preferred embodiment of the invention a switching mechanism SWM is provided, so designed that when the input shaft is rotating, of the three couplings precisely one coupling is ever released and the remaining two couplings are engaged. This means that two sub-assemblies which are in themselves rigid are permanently present, one rotating relative to the other. Rotation takes place about the axis of the particular coupling that has been released. In this manner it is possible to carry out exact rotational positioning about each of the three axes. In the apparatus according to the invention the three brackets are connected to each other in the manner of a cardan joint. The power transmission assemblies for the individual brackets are connected in series and the brackets can be fixed relative to each other using couplings. Appropriate manipulation of the couplings ensures that the rotational motions about the individual axes can be carried out separately from each other. It is not absolutely necessary for the input shaft to be led through a rotary transmission duct of a vacuum vessel. It is equally possible to use a translational transmission duct and only convert the translational motion of the input shaft into a rotary motion inside the vacuum vessel itself. The couplings required within the apparatus can be actuated electrically, pneumatically, hydraulically or by similar means. The vacuum transmission ducts required to control and power the couplings are static and hence present no problems.

In one preferred embodiment of the invention a first power transmission assembly driven by the input shaft drives a wheel mounted on the first bracket eccentrically and parallel to the latter's axis or else at right angles to the first axis, which wheel in turn causes the third bracket to rotate via a second power transmission assembly. Should the first power transmission assembly lock because the couplings following it in the power transmission line are engaged, the first bracket is set in rotational motion in relation to the frame. In this event all three brackets form a rigid sub-assembly together with the second power transmission assembly which rotates in its entirety relative to the frame.

BRIEF DESCRIPTION OF THE DRAWINGS

Working examples of the invention are outlined as follows with reference to the drawings.

DESCRIPTION OF THE PREFERRED EMBODIMENT

Figure 1:
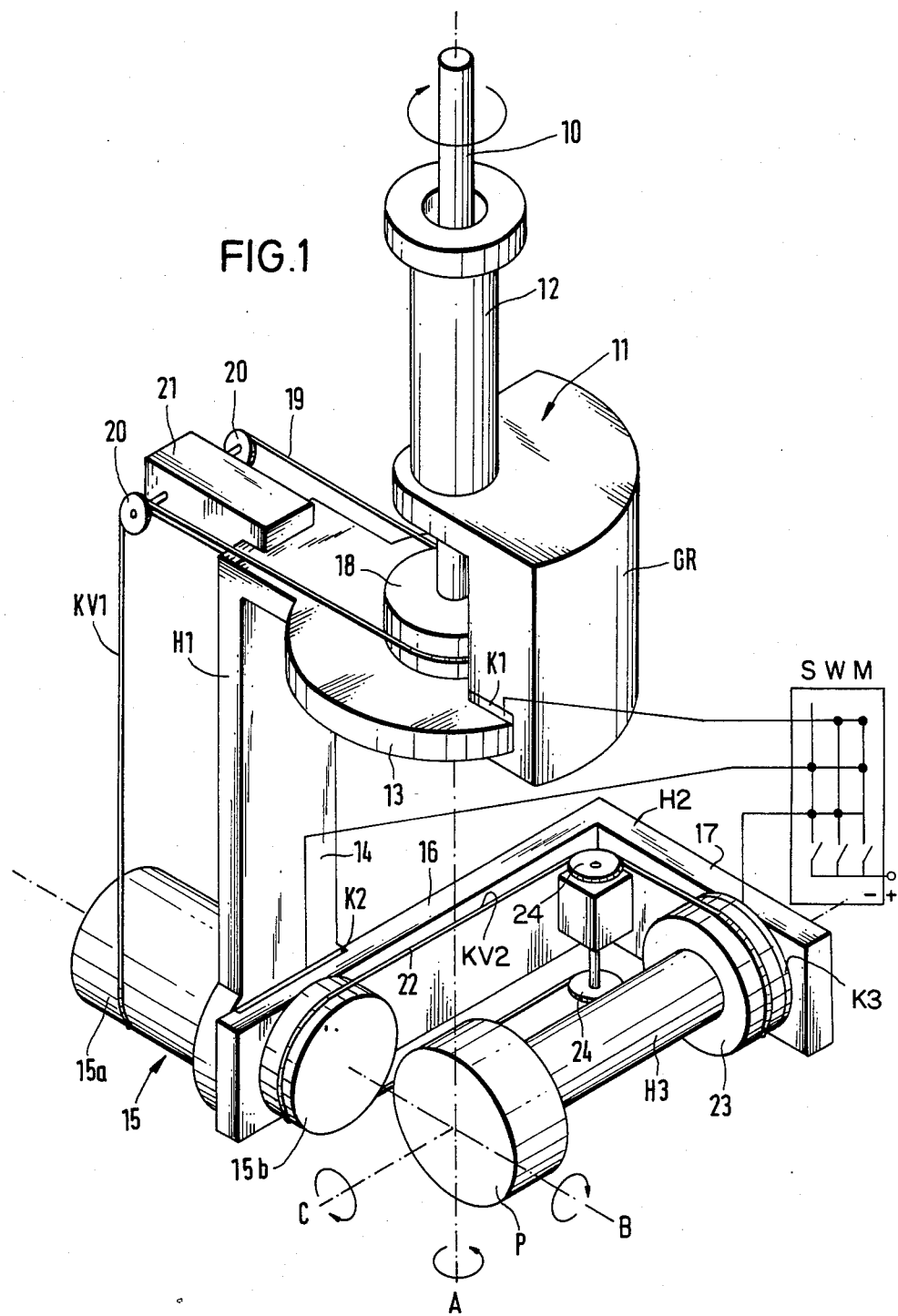
FIG. 1 shows a schematic perspective diagram of a first working example.

In FIG. 1 input shaft 10 is pivotably mounted in a tubular shoulder 12 of frame 11. A plate 13 of first bracket H1 is mounted in the frame co-axial to input shaft 10. The axis of input shaft 10 and the axis of rotation of plate 13 coincide with first axis A of the apparatus. A support 14 of first bracket H1 extends from plate 13 parallel to axis A. A wheel 15 is mounted at the extremity of support 14 and comprises components 15a and 15b which are permanently connected together. The axis of said wheel 15 forms second axis B of the apparatus. Support 16 of second bracket H2 is also mounted on the axis of wheel 15. This support 16 is shorter than support 14 of the first bracket, thus enabling it to be swivelled by 360° about axis B, from which it projects at right angles. An additional support 17 of second bracket H2 projects from the free end of support 16 parallel to axis B. Bracket H3 is pivotably mounted on support 17. The rotation axis of this third bracket H3 coincides with third axis C of the apparatus. The specimen P is located at the extremity of bracket H3, at the point of intersection of all three axes A, B and C.

A wheel 18 is fixed to input shaft 10 and a belt 19 runs round the former. This belt 19 runs over pulleys 20, mounted on a cantilever 21 of first bracket H1, to component 15a of wheel 15. Belt 19 is in the form of a closed loop and makes up the first power transmission assembly KV1. The second power transmission assembly KV2 is formed by a second belt 22 likewise consisting of a closed loop. Belt 22 runs over component 15b of wheel 15 and over an additional wheel 23 permanently fixed to third bracket H3 and arranged co-axial to it. The direction of travel of belt 22 is changed by pulleys 24 mounted on second bracket H2.

A first coupling K1 is provided between frame GR and plate 13 of bracket H1. When this coupling is engaged, bracket H1 is prevented from rotating relative to frame GR. In this event said components are rigidly connected to one another by coupling K1. A second coupling K2 can block the rotation of bracket H2 relative to bracket H1 and a third coupling K3 can block the rotation of bracket H3 relative to bracket H2.

When the apparatus is in operation the following modes result:
1. Coupling K1 released,
   Couplings K2 and K3 engaged,
   Rotation about axis A,
2. Coupling K2 released,
   Couplings K1 and K3 engaged,
   Rotation about axis B,
3. Coupling K3 released,
   Couplings K1 and K2 engaged,
   Rotation about axis C.

Couplings K1, K2 and K3 are for example actuated electromagnetically.

In mode 1 as outlined above, brackets H1, H2 and H3 form a unit together with wheels 15 and 23 which in its entirety is rigid. Belt 19, which is driven by rotating wheel 18, cannot travel round wheel 15, which is locked against rotation, and so belt 19 turns said rigid unit about axis A.

In operating mode 2 bracket H1 is rigidly connected to frame GR and bracket H2 is rigidly connected to bracket H3. Wheel 15 drives belt 22. Since the latter cannot run round locked wheel 23. the unit comprising bracket H2 and bracket H3 rotates about axis B.

In the third mode of operation brackets H1 and H2 form a rigid unit with frame GR. Wheel 23 with brackets H3 is driven via belt 19. rotating wheel 15 and belt 22, causing specimen P to rotate about axis C.

Figure 2:
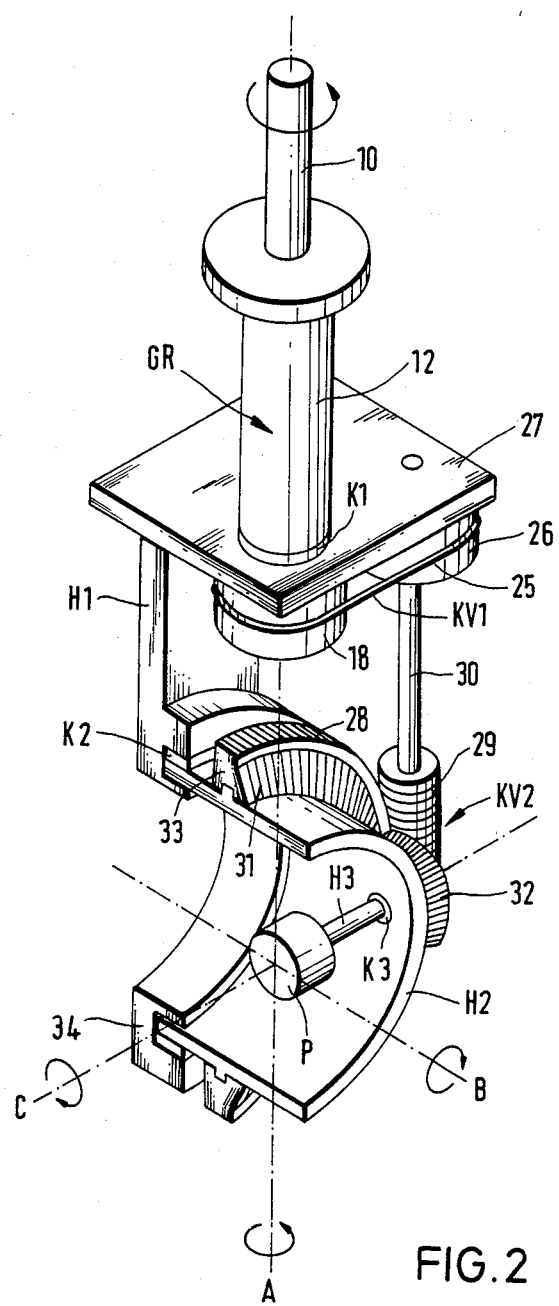
FIG. 2 shows a schematic perspective diagram of a second working example.

In the working example shown in FIG. 2, input shaft 10 is likewise mounted on frame GR. A wheel 18 sits on the input shaft, whose axis coincides with axis A of the apparatus, and drives an additional wheel 26, whose axis runs parallel to axis A, via belt 25, which forms the first power transmission assembly KV1. This wheel 26 is mounted on a plate 27 of first bracket H1. The first coupling K1 is disposed between frame GR and plate 27.

Bracket H1 exhibits an arc-shaped guide rail 34 whose axis coincides with axis B of the apparatus and therefore runs at right angles to axis A. Bracket H2, which is in the form of an arc, is mounted in circular-segmental guide rail 34 and its axis likewise coincides with axis B of the apparatus. This circular segment exhibits an enclosing, pivotably mounted circular segment 33 having a toothed rim 28, whose teeth mesh with a worm gear 29 connected via a shaft 30 to wheel 26. Toothed rim 28 is further provided with spur-gear teeth 31 engaging with a gear 32. Axis 33 of gear 32 is formed by bracket H3. This bracket is mounted in coupling K3, which in turn is fixed to bracket H2. Specimen P is located at the free end of bracket H3, at the point of intersection of the three axes A, B and C.

Belt 25 forms the first power transmission assembly KV1 for transmitting the rotation of input shaft 10 to a wheel 26 mounted on first bracket H1. The gear mechanism comprising worm gear 29, ring 33 and gear 32 forms the second power tramission assembly KV2 for transmitting the rotation of wheel 26 to bracket H2 or bracket H3. Second coupling K2 is disposed between bracket H1 and bracket H2.

In the apparatus shown in FIG. 2 the same three operating modes are possible as in the apparatus according to FIG. 1. If coupling K1 along is released, brackets H1 and H2 form a rigid unit together with power transmission assembly KV2 and wheel 26, and said rigid unit rotates about the axis of wheel 18 (axis A). If coupling K2 along is released, worm gear 29 drives ring 33, which via gear 32 blocked by coupling K3 drives bracket H2, thereby causing bracket H2 to turn on axis B. If on the other hand coupling K3 alone is released, worm gear 29 then turns ring 33, which is mounted on bracket H2, and spur-gear teeth 31 of ring 33 drive bracket H3 via gear 32, causing bracket H3 to turn on axis C.

Figure 3:
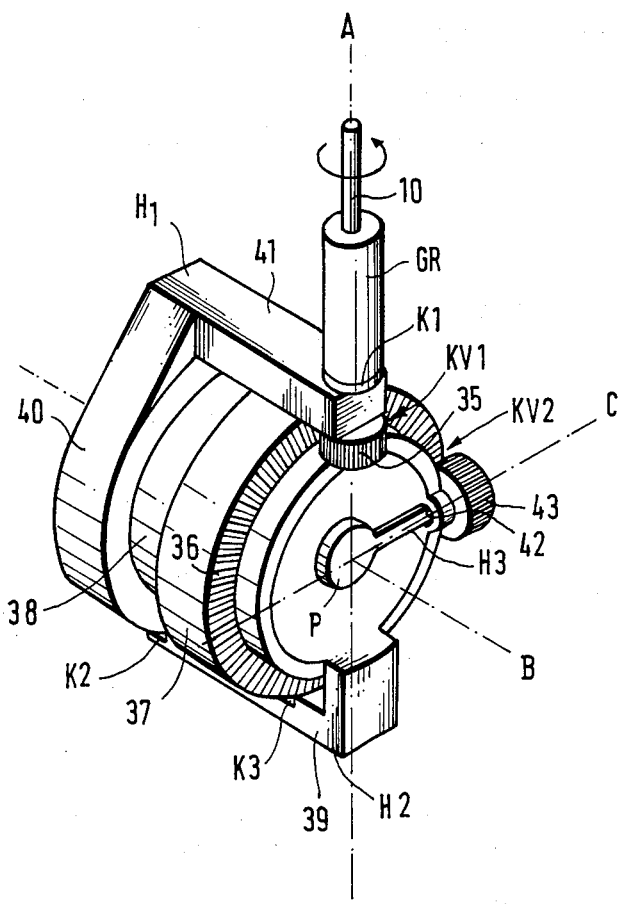
FIG. 3 shows a schematic perspective diagram of a third working example.

In the working example shown in FIG. 3, vertical input shaft 10 is pivtably mounted in immovable frame GR. At the lower extremity of input shaft 10 is fixed a pinion 35 which turns with the input shaft. Pinion 35 meshes with the spur-gear teeth 36 of a ring 37 arranged co-axial to axis B. Ring 37 is pivotably mounted on a sleeve 38 likewise arranged co-axial to axis B. A support 39 projecting from the front end of sleeve 38 is bent to the back and extends to the back at a radial distanceover the outer face of sleeve 38. Sleeve 38 forms second bracket H2 in conjunction with support 39. This bracket H2 is pivotably mounted in a ring 40 of first bracket H1, with sleeve 38 projecting into a corresponding opening in ring 40 while the extremity at the rear of support 39 overlaps the outer surface of ring 40. Support 39 is provided with two couplings K2 and K3, one coupling K2 bearing on ring 40 and the other coupling K3 bearing on ring 37. First bracket H1 exhibits a support 41 whose axis runs parallel to ring 40, said support 41 being mounted on frame GR and bored to receive input shaft 10, which projects through it. First coupling K1 is disposed between frame GR and support 41.

Sleeve 38 of second bracket H2 exhibits a radial bore 42 through which the shaft forming third bracket H3 projects. Specimen P is disposed at the extremity of bracket H3 on the central axis of sleeve 38. On the outside of sleeve 38 a pinion 43 is fixed on bracket H3 and meshes with spur-gear teeth 36 of ring 37. While pinion 35 forms the first power transmission assembly KV1 together with ring 37, pinion 43 forms the second power transmission assembly KV2 together with ring 37.

When engaged, first coupling K1 connects first bracket H1 to frame GR. Second coupling K2, when engaged, connects second bracket H2 to first bracket H1, and when third coupling K3 is engaged it connects ring 37 to second bracket H2, thereby causing second power transmission assembly KV2 to become rigid and so prevent bracket H3 from turning relative to bracket H2. The three possible modes of operation for the working example shown in FIG. 3 are identical to those indicated above for the working example of FIG. 1. The working example of FIG. 3 has the advantage that power transmission assemblies KV1 and KV2 are very simple in their construction and that only three gears are required in all. There is an additional advantage in the fact that the two couplings K2 and K3 are jointly mounted on second bracket H2.

What we claim is:

1. An apparatus for rotating a specimen about any one of three axes, comprising:
    a single input shaft,
    a first bracket pivotably mounted relative to said input shaft and co-axial to a first axis,
    a second bracket which pivots on said first bracket about a second axis running at right angles to said first axis, said first and second axis intersecting at a point of intersection,
    a third bracket supporting said specimen, said third bracket pivoting on said second bracket about a third axis running at right angles to said second axis through the point of intersection of said first and second axes,
    said single input shaft being mounted to a frame, said frame being connected to said first bracket, said first bracket being connected to said second bracket, said second bracket being connected to said third bracket,
    a plurality of power transmission assemblies connected in series to said input shaft for selectively rotating said first bracket about said first axis, said second bracket about said second axis, and said third bracket about said third axis,
    a first coupling for retaining said first bracket relative to said frame, a second coupling for retaining said second bracket relative to said first bracket, and a third coupling for retaining said third bracket relative to said second bracket, and
    a switching mechanism for releasing one of said three couplings and engaging the remaining two of such three couplings.

2. An apparatus for rotating a specimen about any one of three axes, comprising:
    a single input shaft,
    a first bracket pivotably mounted relative to said input shaft and co-axial to a first axis,
    a second bracket which pivots on said first bracket about a second axis running at right angles to said first axis, said first and second axes intersecting at a point of intersection,
    a third bracket supporting said specimen, said third bracket pivoting on said second bracket about a third axis running at right angles to said second axis through the point of intersection of said first and second axes,
    said single input shaft being mounted to a frame, said frame being connected to said first bracket, said first bracket being connected to said second bracket, said second bracket being connected to said third bracket,
    a plurality of power transmission assemblies connected in series to said input shaft for selectively rotating said first bracket about said first axis, said second bracket about said second axis, and said third bracket about said third axis,
    a first coupling for retaining said first bracket in fixed position relative to said frame, a second coupling for retaining said second bracket in fixed position relative to said first bracket, and a third coupling for retaining said third bracket in fixed position relative to said second bracket,
    a first one of said plurality of power transmission assemblies driving a first wheel which rotates said first bracket, said first wheel also being connected to a second one of said power transmission assemblies for rotating said third bracket,
    wherein said input shaft is designed to exert a torque about said first axis on said first bracket when the first wheel is prevented from rotating.

3. An apparatus for rotating a specimen about any one of three axes, comprising:
    a single input shaft,
    a first bracket pivotably mounted relative to said input shaft and co-axial to a first axis,
    a second bracket which pivots on said first bracket about a second axis running at right angles to said first axis, said first and second axes intersecting at a point of intersection,
    a third bracket supporting said specimen, said third bracket pivoting on said second bracket about a third axis running at right angles to said second axis through the point of intersection of said first and second axes,
    said single input shaft being mounted to a frame, said frame being connected to said first bracket, said first bracket being connected to said second bracket, said second bracket being connected to said third bracket,
    a plurality of power transmission assemblies connected in series to said input shaft for selectively rotating said first bracket about said first axis, said second bracket about said second axis, and said third bracket about said third axis,
    a first coupling for retaining said first bracket in fixed position relative to said frame, a second coupling for retaining said second bracket in fixed position relative to said first bracket, and a third coupling for retaining said third bracket in fixed position relative to said second bracket, and
    a first one of said plurality of power transmission assemblies driving a first wheel which rotates said first bracket, said wheel also being connected to a second one of said power transmission assemblies for rotating said third bracket,
    wherein said second one of said plurality of power transmission assemblies is designed to exert a torque about said second axis on said second bracket when the second wheel is prevented from rotating.

4. An apparatus for rotating a specimen about any one of three axes, comprising:
    a single input shaft,
    a first bracket pivotably mounted relative to said input shaft and co-axial to a first axis,
    a second bracket which pivots on said first bracket about a second axis running at right angles to said first axis, said first and second axes intersecting at a point of intersection,
    a third bracket supporting said specimen, said third bracket pivoting on said second bracket about a third axis running at right angles to said second axis through the point of intersection of said first and second axes, said single input shaft being mounted to a frame, said frame being connected to said first bracket, said first bracket being connected to said second bracket, said second bracket being connected to said third bracket, a plurality of power transmission assemblies connected in series to said input shaft for selectively rotating said first bracket about said first axis, said second bracket about said second axis, and said third bracket about said third axis, a first coupling for retaining said first bracket relative to said frame, a second coupling for retaining said second bracket relative to said first bracket, and a third coupling for retaining said third bracket relative to said second bracket, and a first one of said plurality of power transmission assemblies driving a wheel which rotates said first bracket, said wheel also being connected to a second one of said power transmission assemblies for rotating said third bracket, wherein said wheel is mounted so that its axis is perpendicular to said first axis.

5. An apparatus for rotating a specimen about any one of three axes, comprising:
a single input shaft,
a first bracket pivotably mounted relative to said input shaft and co-axial to a first axis,
a second bracket which pivots on said first bracket about a second axis running at right angles to said first axis, said first and second axes intersecting at a point of intersection,
a third bracket supporting said specimen, said third bracket pivoting on said second bracket about a third axis running at right angles to said second axis through the point of intersection of said first and second axes,
said single input shaft being mounted to a frame, said frame being connected to said first bracket, said first bracket being connected to said second bracket, said second bracket being connected to said third bracket,
a plurality of power transmission assemblies connected in series to said input shaft for selectively rotating said first bracket about said first axis, said second bracket about said second axis, and said third bracket about said third axis,
a first coupling for retaining said first bracket relative to said frame, a second coupling for retaining said second bracket relative to said first bracket, and a third coupling for retaining said third bracket relative to said second bracket, and
wherein said first bracket further comprises an annular guide rail, whose axis coincides with said second axis, for guiding said second bracket, said second bracket being configured as an annular segment containing a pivotal element with teeth for meshing with a gear integrally connected to said third bracket.

6. An apparatus for rotating a specimen about any one of three axes, comprising:
a single input shaft,
a first bracket pivotably mounted relative to said input shaft and co-axial to a first axis,
a second bracket which pivots on said first bracket about a second axis running at right angles to said first axis, said first and second axes intersecting at a point of intersection,
a third bracket supporting said specimen, said third bracket pivoting on said second bracket about a third axis running at right angles to said second axis through the point of intersection of said first and second axes,
said single input shaft being mounted to a frame, said frame being connected to said first bracket, said first bracket being connected to said second bracket, said second bracket being connected to said third bracket,
a plurality of power transmission assemblies connected in series to said input shaft for selectively rotating said first bracket about said first axis, said second bracket about said second axis, and said third bracket about said third axis,
a first coupling for retaining said first bracket relative to said frame, a second coupling for retaining said second bracket relative to said first bracket, and a third coupling for retaining said third bracket relative to said second bracket, and
wherein said second bracket further comprises a sleeve containing a first support arm for supporting a first ring pivotably mounted on said sleeve, said ring containing teeth; and wherein said first bracket further comprises a second ring pivotably mounted on said sleeve and a second support arm connected to said input shaft, said input shaft containing a pinion to mesh with said teeth of said first ring.

7. An apparatus for rotating a specimen about three mutually perpendicular axes with only a single rotary input shaft, comprising:
a single rotary input shaft,
three interconnected brackets rotatable along three mutually perpendicular axes, all three axes intersecting at a single point, one of said brackets being designed to hold a specimen,
a plurality of power transmission means for transmitting rotational motion imparted by said single input shaft to each of said brackets, and
a plurality of fixable couplings, operative on each of said brackets, for selectively fixing the relative position of each of said brackets. ixable couplings, operative on each of said brackets, for selectively fixing the relative position of each of said brackets.

* * * * *